(12) United States Patent
Maehara et al.

(10) Patent No.: US 7,966,978 B2
(45) Date of Patent: Jun. 28, 2011

(54) COOLING CONTROL UNIT FOR WATER-COOLED MULTI-CYLINDER INTERNAL COMBUSTION ENGINE HAVING CYLINDER DEACTIVATION MECHANISM

(75) Inventors: Hayato Maehara, Saitama (JP); Takaaki Tsukui, Saitama (JP); Shinji Saito, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 491 days.

(21) Appl. No.: 12/146,630

(22) Filed: Jun. 26, 2008

(65) Prior Publication Data

US 2009/0000576 A1 Jan. 1, 2009

(30) Foreign Application Priority Data

Jun. 29, 2007 (JP) ................................. 2007-171540

(51) Int. Cl.
*F01P 3/00* (2006.01)
*F02B 77/08* (2006.01)
(52) U.S. Cl. ............ 123/41.29; 123/41.09; 123/198 DB
(58) Field of Classification Search .................. 123/41.1, 123/41.02, 41.08, 41.09, 41.15, 41.29, 41.28, 123/198 F, 198 DB, 332, 334
See application file for complete search history.

(56) References Cited

U.S. PATENT DOCUMENTS 2,675,789 A * 4/1954 Watkins et al. ............ 123/41.13
4,436,060 A * 3/1984 Tanaka et al. ................ 123/41.1
6,640,543 B1 * 11/2003 Seal ................................ 60/609
6,786,191 B2 * 9/2004 Foster ......................... 123/198 F
2002/0174840 A1 * 11/2002 Luckner et al. ............. 123/41.1

FOREIGN PATENT DOCUMENTS

CN 1782349 A 6/2006
JP 8-93516 A 4/1996

\* cited by examiner

*Primary Examiner* — Michael Cuff
*Assistant Examiner* — Hung Q Nguyen
(74) *Attorney, Agent, or Firm* — Birch, Stewart, Kolasch & Birch, LLP

(57) ABSTRACT

A cooling control unit for a water-cooled multi-cylinder internal combustion engine having a cylinder deactivation mechanism for controlling the flow of coolant to prevent the internal combustion engine from being incompletely warmed up when the internal combustion engine returns to its operating condition with all of the cylinders being activated. A communicating passage communicates with a normally activated cylinder coolant jacket as a coolant passage formed for normally activated cylinders and a deactivation-programmed cylinder water jacket as a coolant passage formed for the deactivation-programmed cylinders to communicate with each other, and through which the coolant flows. A bypass passage diverges from the communicating passage and bypasses the deactivation-programmed cylinder coolant jacket. A diversion control valve is provided in a diversion section where the bypass passage diverges from the communication passage. A control member controls the diversion control valve in accordance with the operating state of the internal combustion engine.

18 Claims, 5 Drawing Sheets

COOLING CONTROL UNIT FOR WATER-COOLED MULTI-CYLINDER INTERNAL COMBUSTION ENGINE HAVING CYLINDER DEACTIVATION MECHANISM

CROSS-REFERENCE TO RELATED APPLICATIONS

The present application claims priority under 35 USC 119 to Japanese Patent Application No. 2007-171540 filed on Jun. 29, 2007 the entire contents of which are hereby incorporated by reference.

BACKGROUND OF THE INVENTION

1. Field of the Invention

The present invention relates to a cooling control unit for a water-cooled multi-cylinder internal combustion engine having a cylinder deactivation mechanism.

2. Description of Background Art

In a multi-cylinder internal combustion engine of a type capable of deactivating some of its cylinders, the cylinders which have been deactivated for a long time are sometimes incompletely warmed up when the engine returns to an operating condition with all of the cylinders being activated.

For the purpose of preventing such an incomplete warm-up condition, a certain multi-cylinder internal combustion engine is controlled in such a manner that the engine valves can repeatedly alternate their own activation and deactivation according to a previously set engine valve operation and stoppage modes while the engine is operated with some cylinders being deactivated. See, for example, Japanese Patent Application No. Hei. 8-93516.

In the case of the multi-cylinder internal combustion engine having a cylinder deactivation mechanism disclosed in Japanese Patent Application No. Hei. 8-93516, each of its cylinders is provided with valve activation/deactivation switching means for switching its corresponding engine valves between their activation and deactivation independently of the rest of the cylinders.

In this case, the multiple cylinders are provided with their respective valve activation/deactivation switching means. This increases the number of component parts, and makes the control of the cylinders complicated. In addition, the arrangement of the valve activation/deactivation switching means makes the structure of the internal combustion engine complicated, and increases the manufacturing costs.

SUMMARY AND OBJECTS OF THE INVENTION

The present invention has been made with these problems taken into consideration. An object of an embodiment of the present invention is to provide a simply configured cooling control unit for a water-cooled multi-cylinder internal combustion engine having a cylinder deactivation mechanism, the cooling control unit being capable of controlling the flow of coolant, and thus capable of preventing the internal combustion engine from being incompletely warmed up when the internal combustion engine returns to its operating condition with all of the cylinders being activated.

For the purpose of achieving the foregoing object, according to an embodiment of the present invention a cooling control unit for a water-cooled multi-cylinder internal combustion engine having a cylinder deactivation mechanism includes a deactivation-programmed cylinder and a normally activated cylinder so as to partially deactivate the cylinders in accordance with the state of engine operation. The cooling control unit includes a communicating passage through which a normally activated cylinder coolant jacket and a deactivation-programmed cylinder coolant jacket communicate with each other, and through which a coolant flows between the jackets. The normally activated cylinder coolant jacket is a coolant passage formed for the normally activated cylinders. The deactivation-programmed cylinder coolant jacket is a coolant passage formed for the deactivation-programmed cylinders. A bypass passage is provided which diverges from the communicating passage, and which bypasses the deactivation-programmed cylinder coolant jacket. A diversion control valve is provided to a diversion section where the bypass passage diverges from the communicating passage. A control means is provided for controlling the diversion control valve in accordance with the operating state of the internal combustion engine.

According to an embodiment of the present invention, the cooling control unit for the water-cooled multi-cylinder internal combustion engine having a cylinder deactivation mechanism includes an internal combustion engine that is controlled in order that only the normally activated cylinders should be activated while the internal combustion engine is being warmed up, and while a vehicle is running normally, as well as in order that all of the cylinders should be activated while the internal combustion engine is required to output power not less than a predetermined power. The cooling control unit further includes the internal combustion engine that is being warmed up, the control means controls the diversion control valve in order that, after passing the normally activated cylinder coolant jacket, the coolant should flow in the bypass passage without passing the deactivation-programmed cylinder coolant jacket, after the warm-up is completed with the temperature of the coolant in the normally activated cylinder coolant jacket rising to a predetermined temperature, the control means controls the diversion control valve in order that, after passing the normally activated cylinder coolant jacket, the coolant should flow in an adequate amount in the deactivation-programmed cylinder coolant jacket with a condition that the amount should not allow the temperature of the coolant in the normally activated cylinder coolant jacket to go under a predetermined lowest coolant temperature separately set. While all of the cylinders are being activated, the control means controls the diversion control valve in order that, after passing the normally activated cylinder coolant jacket, the coolant should flow in the deactivation-programmed cylinder coolant jacket without passing the bypass passage.

According to an embodiment of the present invention, a cooling control unit for a water-cooled multi-cylinder internal combustion engine includes a cylinder deactivation mechanism having a deactivation-programmed cylinder and a normally activated cylinder so as to partially deactivate the cylinders in accordance with the state of engine operation. The cooling control unit includes a communicating passage through which a normally activated cylinder coolant jacket and a deactivation-programmed cylinder coolant jacket communicate with each other, and through which a coolant flows between the jackets, the normally activated cylinder coolant jacket being a coolant passage formed for the normally activated cylinders, and the deactivation-programmed cylinder coolant jacket being a coolant passage formed for the deactivation-programmed cylinders. A bypass passage which diverges from the communicating passage is provided which bypasses the deactivation-programmed cylinder coolant jacket. A flow rate adjusting valve is provided in the bypass passage with control means being provided for controlling the flow rate adjusting valve in accordance with the operating state of the internal combustion engine.

According to an embodiment of the present invention, the water-cooled multi-cylinder internal combustion engine includes a cylinder deactivation mechanism, the cooling control unit wherein the internal combustion engine is controlled in order that only the normally activated cylinders should be activated while the internal combustion engine is being warmed up, and while a vehicle is running normally, as well as in order that all of the cylinders should be activated while the internal combustion engine is required to output power not less than a predetermined power. The cooling control unit is further characterized in that after the temperature of the coolant in the normally activated cylinder coolant jacket rises to a predetermined temperature, the control means controls the flow rate adjusting valve in order that, after passing the normally activated cylinder coolant jacket, the coolant should flow in an adequate amount in the bypass passage with a condition wherein the amount should not allow the temperature of the coolant in the normally activated cylinder coolant jacket to go under a predetermined lowest coolant temperature separately set while all of the cylinders are being activated, the control means shuts off the bypass passage by closing the flow rate adjusting valve in order that, after passing the normally activated cylinder coolant jacket, the coolant should flow in the deactivation-programmed cylinder coolant jacket without passing the bypass passage.

According to an embodiment of the present invention, a cooling control unit for a water-cooled multi-cylinder internal combustion engine is provided having a cylinder deactivation mechanism including a deactivation-programmed cylinder and a normally activated cylinder so as to partially deactivate the cylinders in accordance with the state of engine operation. The cooling control unit includes a communicating passage through which a normally activated cylinder coolant jacket and a deactivation-programmed cylinder coolant jacket communicate with each other, and through which a coolant flows between the jackets. The normally activated cylinder coolant jacket is a coolant passage formed for the normally activated cylinders. The deactivation-programmed cylinder coolant jacket is a coolant passage formed for the deactivation-programmed cylinders. A bypass passage is provided which diverges from the communicating passage, and which bypasses the deactivation-programmed cylinder coolant jacket. A first flow rate adjusting valve is provided in the bypass passage with a second flow rate adjusting valve being provided at a location downstream of a diversion section where the bypass passage diverges from the communicating passage. Control means is provided for controlling the first flow rate adjusting valve and the second flow rate adjusting valve in accordance with the operating state of the internal combustion engine.

According to an embodiment of the present invention, the water-cooled multi-cylinder internal combustion engine includes a cylinder deactivation mechanism wherein the cooling control unit wherein the internal combustion engine is controlled in order that only the normally activated cylinders should be activated while the internal combustion engine is being warmed up, and while a vehicle is running normally, as well as in order that all of the cylinders should be activated while the internal combustion engine is required to output power not less than a predetermined power. The cooling control unit further includes an internal combustion engine that as the engine is being warmed up, the control means opens the first flow rate adjusting valve and closes the second flow rate adjusting valve in order that, after passing the normally activated cylinder coolant jacket, the coolant should flow in the bypass passage without passing the deactivation-programmed cylinder coolant jacket. After the warm-up is completed with the temperature of the coolant in the normally activated cylinder coolant jacket rising to a predetermined temperature, the control means controls the first flow rate adjusting valve and the second flow rate adjusting valve in order that, after passing the normally activated cylinder coolant jacket, the coolant should flow in an adequate amount in the deactivation-programmed cylinder coolant jacket with a condition wherein the amount should not allow the temperature of the coolant in the normally activated cylinder coolant jacket to go under a predetermined lowest coolant temperature separately set. While all of the cylinders are being activated, the control means controls closes the first flow rate adjusting valve and opens the second flow rate adjusting valve in order that, after passing the normally activated cylinder coolant jacket, the coolant should flow in the deactivation-programmed cylinder coolant jacket without passing the bypass passage.

According to an embodiment of the present invention, the cooling control unit for the water-cooled multi-cylinder internal combustion engine having the cylinder deactivation mechanism is provided wherein the internal combustion engine is a front/rear V-type internal combustion engine mounted on a vehicle, and built in a way that the normally activated cylinders tilt frontward of the vehicle, and the deactivation-programmed cylinders tilt rearward of the vehicle, so that the internal combustion engine is in the shape of a V when viewed from its side.

According to an embodiment of the present invention, the water-cooled multi-cylinder having the cylinder deactivation mechanism is designed to be capable of causing the diversion control valve to set a diversion ratio between a flow rate of the coolant in the deactivation-programmed cylinder coolant jacket and a flow rate of the coolant in the bypass passage because of its simple configuration including the diversion control valve in the diversion section where the bypass passage diverges from the communicating passage through which the normally activated cylinder coolant jacket and the deactivation-programmed cylinder coolant jacket communicate with each other. In addition, the control means is designed to control the diversion control valve in accordance with the operating state of the internal combustion engine. For this reason, while the internal combustion engine is operating with only the normally activated cylinders being activated, the cooling control unit is capable of controlling the diversion control valve under a certain driving condition in order that part of the coolant passing the normally activated cylinder coolant jacket can flow to the deactivation-programmed cylinder coolant jacket. Accordingly, the internal combustion engine can be prevented from being incompletely warmed up when the internal combustion engine returns to its operating condition with all of the cylinders being activated.

The cooling control unit according to an embodiment of the present invention provides the water-cooled multi-cylinder internal combustion engine having the cylinder deactivation mechanism causing the internal combustion engine to accelerate its warm-up, because the cooling control unit is designed to activate only the normally activated cylinders while the internal combustion engine is being warmed up, and while the motor vehicle is running. In addition, the cooling control unit is designed to make the control in order that all of the cylinders should be activated while the internal combustion engine is required to output power not less than the predetermined power, as well as because the cooling control unit is designed to control the diversion control valve in order that, after passing the normally activated cylinder coolant jacket, the coolant should flow in the bypass passing without passing the deactivation-programmed cylinder coolant jacket while the internal combustion engine is being warmed up.

After the warm-up is completed with the temperature of the coolant in the normally activated cylinder coolant jacket rising to the predetermined temperature, the cooling control unit is designed to control the diversion control valve in order that, after passing the normally activated cylinder coolant jacket, the coolant should flow in an adequate amount in the deactivation-programmed cylinder coolant jacket with the condition wherein the amount should not allow the temperature of the coolant in the normally activated cylinder coolant jacket to go under the predetermined temperature separately set. For this reason, the cooling control unit is capable of warming the cylinders which are currently not activated, and accordingly of preventing the internal combustion engine from being incompletely warmed up when the internal combustion engine returns to its operating condition with all of the cylinders being activated.

In addition, while all of the cylinders are being activated, the cooling control unit is designed to control the diversion control valve in order that, after passing the normally activated cylinder coolant jacket, the coolant should flow in the deactivation-programmed cylinder coolant jacket without passing the bypass passage. For this reason, the cooling control unit is capable of efficiently cooling all of the cylinders.

The cooling control unit the water-cooled multi-cylinder internal combustion engine having the cylinder deactivation mechanism is designed to cause the flow rate adjusting valve to adjust not only the flow rate of the coolant in the bypass passage, but also the flow rate of the coolant in the deactivation-programmed cylinder coolant jacket, because of its simple configuration including the flow rate adjusting valve in the bypass passage which diverges from the communicating passage through which the normally activated cylinder coolant jacket and the deactivation-programmed cylinder coolant jacket communicate with each other with the bypass passage bypassing the deactivation-programmed cylinder coolant passage. In addition, the control means is designed to control the flow rate adjusting valve in accordance with the operating state of the internal combustion engine. For this reason, while the internal combustion engine is operating with only the normally activated cylinders being activated, the cooling control unit is capable of controlling the flow rate adjusting valve under a certain driving condition in order that part of the coolant passing the normally activated cylinder coolant jacket can flow to the deactivation-programmed cylinder coolant jacket. Accordingly, the internal combustion engine is prevented from being incompletely warmed up when the internal combustion engine returns to its operating condition with all of the cylinders are activated.

The cooling control unit for the water cooled multi-cylinder internal combustion engine having the cylinder deactivation mechanism is designed to activate only the normally activated cylinders while the internal combustion engine is being warmed up, and while the motor vehicle is running normally. In addition, the cooling control unit is designed to make the control in order that all of the cylinders should be activated while the internal combustion engine is required to output power not less than the predetermined power. Furthermore, after the temperature of the coolant in the normally activated cylinder coolant jacket rises to a predetermined temperature, the cooling control unit is designed to control the flow rate adjusting valve in order that, after passing the normally activated cylinder coolant jacket, the coolant should flow in an adequate amount in the bypass passage with the condition that the amount should not allow the temperature of the coolant in the normally activated cylinder coolant jacket to go under the predetermined lowest coolant temperature separately set. As a result, the cooling control is capable of causing an adequate amount of coolant to flow in the deactivated deactivation-programmed cylinder coolant jacket. Thus, warming of the deactivated cylinders occurs as well as preventing the internal combustion engine from being incompletely warmed up when the internal combustion engine returns to its operating condition with all of the cylinders being activated.

While all of the cylinders are being activated, the cooling control unit is designed to control the shutting off of the bypass passage by closing the flow rate adjusting valve in order that, after passing the normally activated cylinder coolant jacket, the coolant should flow in the deactivation-programmed cylinder coolant jacket without passing the bypass passage. For this reason, the cooling control unit is capable of efficiently cooling all of the cylinders.

The cooling control unit for the water-cooled multi-cylinder internal combustion engine having the cylinder deactivation mechanism is designed to control the first flow rate adjusting valve and the second flow rate adjusting valve in accordance with the operating state of the internal combustion engine because of its simple configuration including the first flow rate adjusting valve provided in the bypass passage which diverges from the communicating passage through which the normally activated cylinder coolant jacket and the deactivation-programmed cylinder coolant jacket in communication with each other. The bypass passage bypassing the deactivation-programmed cylinder coolant jacket is provided with the second flow rate adjusting valve provided at a location downstream of the diversion section where the bypass passage diverges from the communicating passage. For this reason, while the internal combustion engine is operating with only the normally activated cylinders being activated, the cooling control unit is capable of controlling the first and second flow rate adjusting valves under a certain operating condition of the internal combustion engine in order that part of the coolant passing the normally activated cylinder coolant jacket can flow to the deactivation-programmed cylinder coolant jacket. Accordingly, the internal combustion engine is prevented from being incompletely warmed up when the internal combustion engine returns to its operating condition with all of the cylinders being activated.

The cooling control unit for the water-cooled multi-cylinder internal combustion engine having the cylinder deactivation mechanism is designed to activate only the normally activated cylinders while the internal combustion engine is being warmed up, and while the motor vehicle is running normally. In addition, the cooling control unit is designed to make the control in order that all of the cylinders should be activated while the internal combustion engine is required to output power not less than the predetermined power. Furthermore, the cooling control unit is designed to control the opening of the first flow rate adjusting valve and the closing of the second flow rate adjusting valve in order that, after passing the normally activated cylinder coolant jacket, the coolant should flow in the bypass passage without passing the deactivation-programmed cylinder coolant jacket. For this reason, the cooling control unit accelerates the warm-up.

After the warm-up is completed with the temperature of the coolant in the normally activated cylinder coolant jacket rising to the predetermined temperature, the cooling control unit is designed to control the first flow rate adjusting valve and the second flow rate adjusting valve in order that, after passing the normally activated cylinder coolant jacket, the coolant should flow in an adequate amount in the deactivation-programmed coolant jacket with the condition that the amount should not allow the temperature of the coolant in the normally activated cylinder coolant jacket to go under the predetermined lowest coolant temperature separately set. For this reason, the cooling control unit is capable of warming the deactivation-programmed cylinders which are currently not activated. Accordingly, the internal combustion engine is prevented from being incompletely warmed up when the internal combustion engine returns to its operating condition with all of the cylinders being activated.

Moreover, while all of the cylinders are being activated, the cooling control unit is designed to control the closing of the first flow rate adjusting valve and the opening of the second flow rate adjusting valve in order that after passing the normally activated cylinder coolant jacket, the coolant should flow in the deactivation-programmed cylinder coolant jacket without passing the bypass passage. For this reason, the cooling control unit is capable of efficiently cooling all of the cylinders.

The structure of the cam shaft bearing for the front/rear V-type internal combustion engine is built in a way that the internal combustion engine is in the shape of a V when viewed from its side, in which structure the normally activated cylinders tilt frontward, and the deactivation-programmed cylinders tilt rearward. The normally activated cylinders are arranged in the front bank of the internal combustion engine because a larger cooling effect of a flow of air received by the motor when the vehicle is operated is expected. Thereby, the structure of the cam shaft bearing is capable of efficiently cooling the entire internal combustion engine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
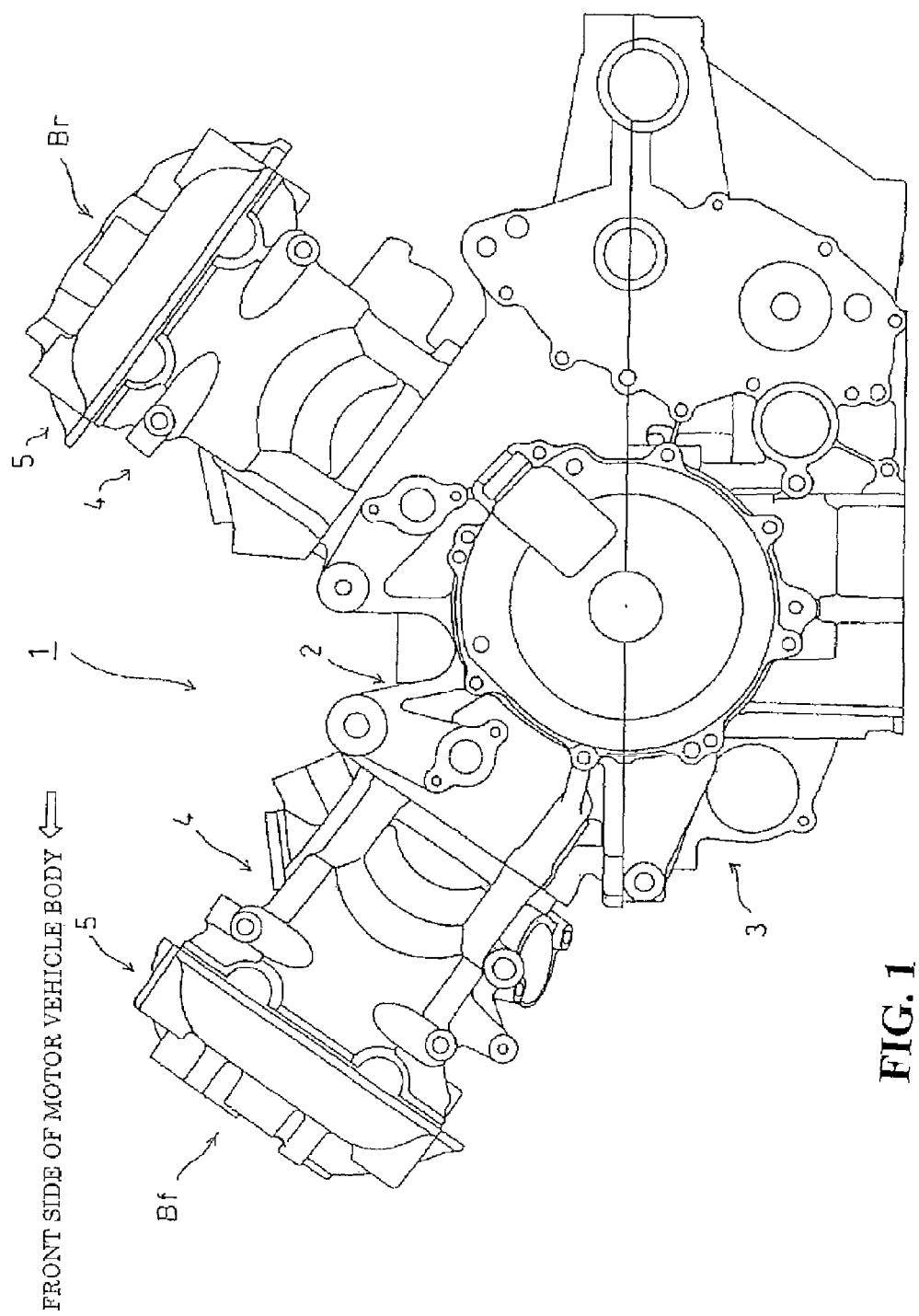
FIG. 1 is an overall side view of a 6-cylinder front/rear V-type water-cooled internal combustion engine according to an embodiment of the present invention.

An OHC 4-stroke internal combustion engine 1 mounted on a motor vehicle, which is not illustrated, is a 6-cylinder front/rear V-type internal combustion engine which, as shown in FIG. 1, includes a crank shaft (not illustrated) oriented in the motor vehicle's width direction, as well as a cylinder row (front bank Bf) consisting of three cylinders in the front side of the motor vehicle body and a cylinder row (rear bank Br) consisting of the other three cylinders in the rear side of the motor vehicle body with the two cylinder rows forming an included angle of approximately 60 degrees. The main body of the OHC 4-stroke cycle internal combustion engine 1 of this type is configured of a cylinder block 2, a crank case 3 integrally attached to the lower surface of the cylinder block 2, cylinder heads 4 and 4 integrally attached respectively to the apex of the cylinder row located forward of the cylinder block 2 in the longitudinal direction of the motor vehicle body and the apex of the cylinder row located rearward of the cylinder block 2 in the longitudinal direction of the motor vehicle body and head covers 5 and 5 respectively covering the cylinder heads 4 and 4.

Inlet apparatuses, including fuel injection valve apparatuses and inlet chambers which are not illustrated here, are arranged in an interstice between the front and rear banks Bf and Br of the OHC 4-stroke cycle internal combustion engine 1. In addition, exhaust pipes, which are not illustrated here, are connected respectively to the front and rear outsides of the cylinder heads 4 and 4 of each of the front bank Bf and the rear bank Br.

The three cylinders of the front bank Bf are all normally activated cylinders, whereas the three cylinders of the rear bank Br are all deactivation-programmed cylinders.

Figure 2:
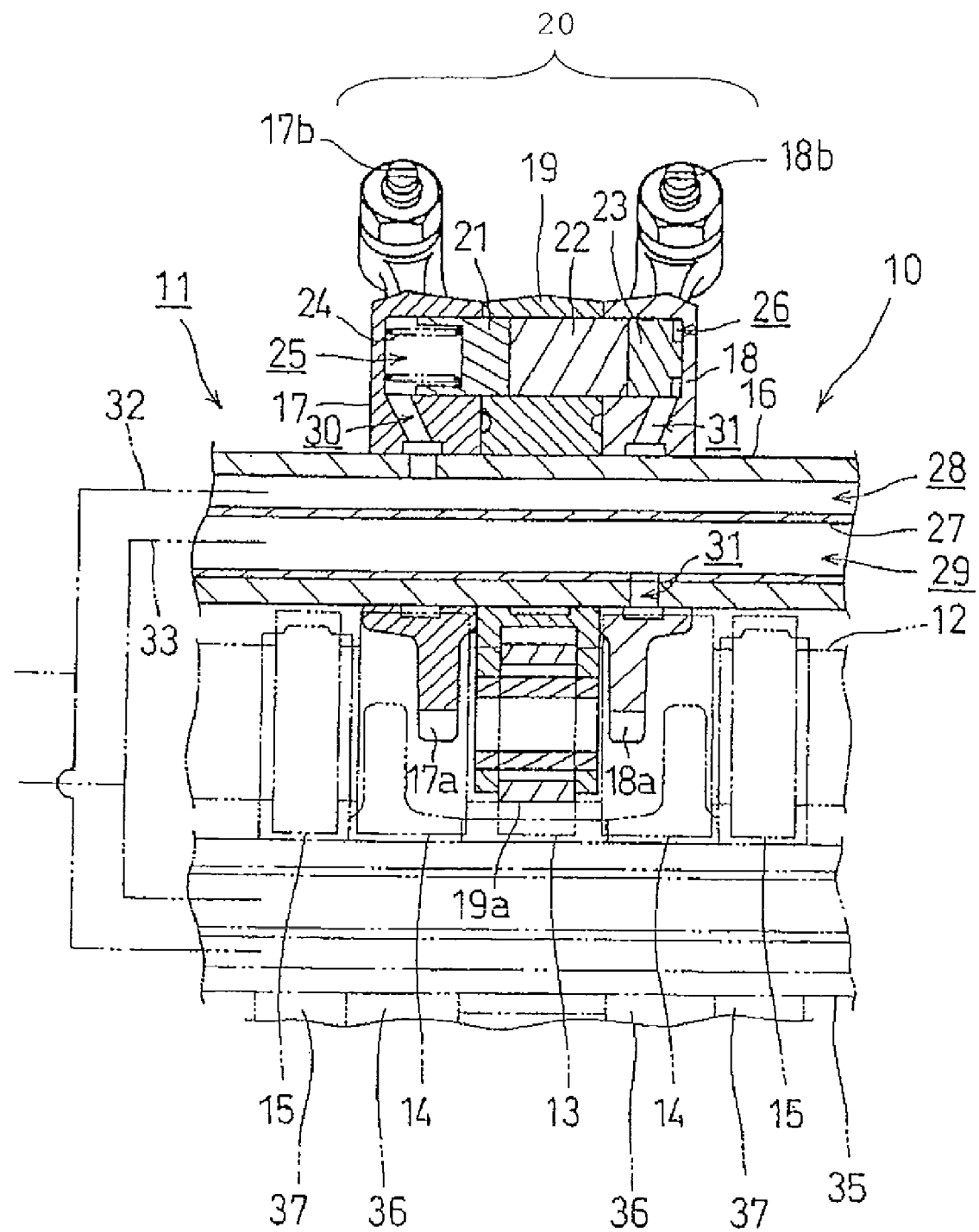
FIG. 2 is a cross-sectional view of an inlet-side part of a cylinder deactivation mechanism which is viewed in the same direction as the center axis of a cylinder extends.

More specifically, a cylinder deactivation switching mechanism 20 which is hydraulically operated is installed in a valve mechanism 10 in only the rear bank Br out of the front bank Bf and the rear bank Bf. FIG. 2 is a cross-sectional view showing how a part of an inlet side of the cylinder deactivation mechanism 20 looks when viewed from above the cylinder head 4 in the same direction as the center axis extends of one of the cylinders.

The valve mechanism 10 is arranged inside a valve chamber 11 formed by the cylinder head 4 connected to the upper end of the cylinder block 2 and the head cover 5 connected to the upper end of the cylinder head 4.

Combustion chambers are formed between the cylinder head 4 and each of the pistons which are slidably fitted into the respective cylinders formed in the cylinder block 2. Inlet ports and exhaust ports, in communication with their corresponding combustion chambers, are formed in the cylinder head 4. A cam shaft 12 which is rotationally driven once for each half number of revolutions of the crank shaft driven by the pistons is inserted in insertion holes respectively in multiple cam holders which are integrally formed in cylinder head 4 at intervals in the same direction that the center axis of the cam shaft 12 extends. The cam shaft 12 is rotatably supported by the journal sections.

In each combustion chamber, paired inlet valves and paired exhaust valves are swingably supported by the cylinder head 4 that are operated by the cam shaft 12. The cams 13, 14 and 15 are provided on the cam shaft 12 with a rocker shaft 16, rocker arms 17, 18 and 19 swingably supported by the rocker shaft 16, as well as the valve mechanism 10 including the cylinder deactivation switching mechanism 20. Paired openings of the inlet port which are closer to the combustion chamber, and paired openings of the exhausted port which are closer to the combustion chamber are opened and closed at their own predetermined timings.

The cylinders in the rear bank Br as a part of the internal combustion engine 1 are deactivated while the engine is being operated with an importance placed on fuel consumption through a low load or the like. To this end, the valve mechanism 10 in the rear bank Br is provided with the cylinder deactivation switching mechanism 20 for holding the inlet valves and the outlet valves closed while the engine is operating with the cylinders in the rear bank being deactivated.

Descriptions will be provided hereinbelow chiefly for the cylinder deactivation switching mechanism 20 provided closer to the inlet valves as illustrated in FIG. 2.

In each combustion chamber, the cam shaft 12 is provided with the inlet cam 13, the paired deactivation cams 14 positioned at the respective two sides of the inlet cam 13 with the inlet cam 13 being interposed in between, the paired exhaust cams 15 positioned at the sides of the respective two deactivation cams 14 with the inlet cam 13 and the deactivation cams 14 being interposed in between.

Each of the inlet cam 13 and the exhaust cams 15 has its own cam profile including a base circular section and a nose section which has a predetermined amount of lift and an operating angle. Each of the deactivation cams 14 has its own cam profile including only a base circular section whose radius is equal to that of the base circular section of each of the inlet cam 13 and the exhaust cams 15. Each of the deactivation cams 14 holds its corresponding inlet valve and exhaust valve closed while the engine is operating with the cylinders in the rear bank being deactivated.

In each combustion chamber, the paired driving rocker arms 17 and 18 as well as the free rocker arm 19 interposed between the paired driving rocker arms 17 and 18 are swingably supported by the rocker shaft which is inserted in insertion holes respectively in multiple rocker shaft holders fastened to the cylinder head 4 with bolts.

A slipper 17a slidingly contacting its corresponding deactivation cam 14 is formed in an end portion of the driving rocker arm 17 whereas a slipper 18a slidingly contacting its corresponding deactivation cam 14 is formed in an end portion of the driving rocker arm 18. A tappet screw 17b abutting on its corresponding inlet valve is formed in the other end portion of the driving rocker arm 17 whereas a tappet screw 18b abutting on its corresponding inlet valve is formed in the other end portion of the driving rocker arm 18.

In addition, a roller 19a rollingly contacting the exhaust cam 13 is rotatably supported by an end portion of the free rocker arm 19. The free rocker arm 19 is biased toward the inlet cam 13 by a spring of a lost motion mechanism supported by the cylinder head 4.

The cylinder deactivation switching mechanism 20 is provided in a way that the cylinder deactivation switching mechanism 20 ranges over the driving rocker arms 17 and 18 as well as the free rocker arm 19. The cylinder deactivation switching mechanism 20 is that which enables the driving rocker arms 17 and 18 to be connected to, and disconnected from, the free rocker arm 19.

The cylinder deactivation switching mechanism 20 includes a connecting piston 21 for enabling the driving rocker arm 17 and the free rocker arm 19 to be connected to each other, a connecting pin 22 for enabling the driving rocker arm 17 and the free rocker arm 19 to be connected to each other, a release piston 23 for restricting the movement of the connecting pin 22, and concurrently for disconnecting the driving rocker arms 17 and 18 from the free rocker arm 19; a return spring 24 for causing the connecting pin 22 to abut on the connecting piston 21, and concurrently for causing the release pin 23 to abut on the connecting pin 22. A first hydraulic chamber 25 is formed in the driving rocker arm 17, and to which a hydraulic fluid for moving the connecting piston 21 is supplied, from which the hydraulic fluid is discharged, as well as which accommodates the return spring 24. A second hydraulic chamber, formed in the driving rocker arm 18, is provided for moving the release piston 23.

A pipe 27 inserted in a hollow section of the cylindrical rocker shaft 16 divides the hollow section. A first hydraulic fluid passage 28 is thus formed between the pipe 27 and the rocker shaft 16. In addition, a second hydraulic fluid passage 29 is thus formed in the hollow section of the pipe 27.

The first hydraulic chamber 25 always communicates with the first hydraulic fluid passage 28 through a communicating passage 30 formed in the driving rocker arm 17. The second hydraulic chamber 26 always communicates with the second hydraulic fluid passage 29 through a communicating passage 31 formed in the driving rocker arm 18 and the pipe 27.

The first hydraulic fluid passage 28 and the second hydraulic fluid passage 29 communicate with a hydraulic control valve apparatus (not illustrated) attached to the cylinder head 4 respectively through a first fluid passage 32 and a second fluid passage 33 formed in the cylinder head 4.

An oil pump provides a source of hydraulic pressure, the oil pump is driven and operated by the internal combustion engine 1.

On the other hand, in the exhaust side of the head cylinder, a valve operating characteristic changing mechanism is provided at a location closer to the exhaust valve in a way that the valve operating characteristic changing mechanism ranges over paired driving rocker arms 36 and paired free rocker arms 37 swingably supported by the rocker shaft 35. The valve operating characteristic changing mechanism includes connecting pistons for enabling the driving rocker arms 36 to be respectively connected to the free rocker arms 37, respectively and release pistons for restricting the movement of the respective connecting pistons, and concurrently for releasing the driving rocker arms 36 from the respective free rocker arms 37. Like the cylinder deactivation switching mechanism 20 in the inlet side of the head cylinder, the pistons are operated by hydraulic pressures of the hydraulic fluids of the first hydraulic fluid passage 28 and the second hydraulic fluid passage 29.

While the engine is operating with all of the cylinders being activated, the first hydraulic fluid passage 28 is caused to communicate with a high-pressure fluid passage through the first fluid passage 32 by the hydraulic control valve apparatus which is controlled according to the driving condition of the motor vehicle, and the pressure of the hydraulic fluid thus becomes higher. On the other hand, the second hydraulic fluid passage 29 is caused to communicate with a drain fluid passage through the second fluid passage 33, and the pressure of the hydraulic fluid thus becomes lower.

As a result, the difference in pressure between the first hydraulic chamber 25 and the second hydraulic chamber 26 causes the connecting piston 21 to push the connecting piston 22 and the release piston 23, as well as to position the abutment surface between the connecting piston 21 and the connecting pin 22 inside the free rocker arm 19, and the abutment surface between connecting pin 22 and the release piston 23 inside the driving rocker arm 18. Consequently, the driving rocker arms 17 and 18 are connected to the free rocker arm 19. Thereby, the swings respectively of the driving rocker arms 17 and 18 are restricted by the cam profile of the inlet cam 13. This opens or closes the inlet valves at their respective predetermined timings with their respective amounts of lift. Similarly, this opens and closes the exhaust valves at their respective predetermined timings with their respective amounts of lift.

In addition, while the engine is operating with the cylinders in the rear bank being deactivated, the first hydraulic fluid passage 28 is caused to communicate with the drain fluid passage through the first fluid passage 32 by the hydraulic control valve apparatus, and the pressure of the hydraulic fluid thus becomes lower. On the other hand, the second hydraulic fluid passage 29 is caused to communicate with the high-pressure fluid passage through the second fluid passage 33, and the pressure of the hydraulic fluid thus becomes higher.

As a result, the hydraulic pressure in the first hydraulic chamber 25 becomes lower whereas the hydraulic pressure in the second hydraulic chamber 26 becomes higher. Consequently, starting with the condition shown in FIG. 2, the difference in pressure between the first hydraulic chamber 25 and the second hydraulic chamber 26 causes the release piston 23 to push the connecting piston 21 and the connecting pin 22. Thus, the abutment surface between the connecting piston 21 and the connecting pin 22 is positioned between the driving rocker arm 17 and the free rocker arm 19, and the abutment surface between the connecting pin 22 and the release piston 23 is positioned between the driving rocker arm 17 and the free rocker arm 19. Consequently, the driving rocker arm 17 is released from the free rocker arm 19, and the driving rocker arm 18 is released from the free rocker arm 19.

Thereby, the swings of the driving rocker arms 17 and 18 are restricted by the profiles of the deactivation cams 14, respectively. Accordingly, the inlet valve is closed, and the exhaust valve is similarly closed. Thus, the cylinders are deactivated.

Figure 3:
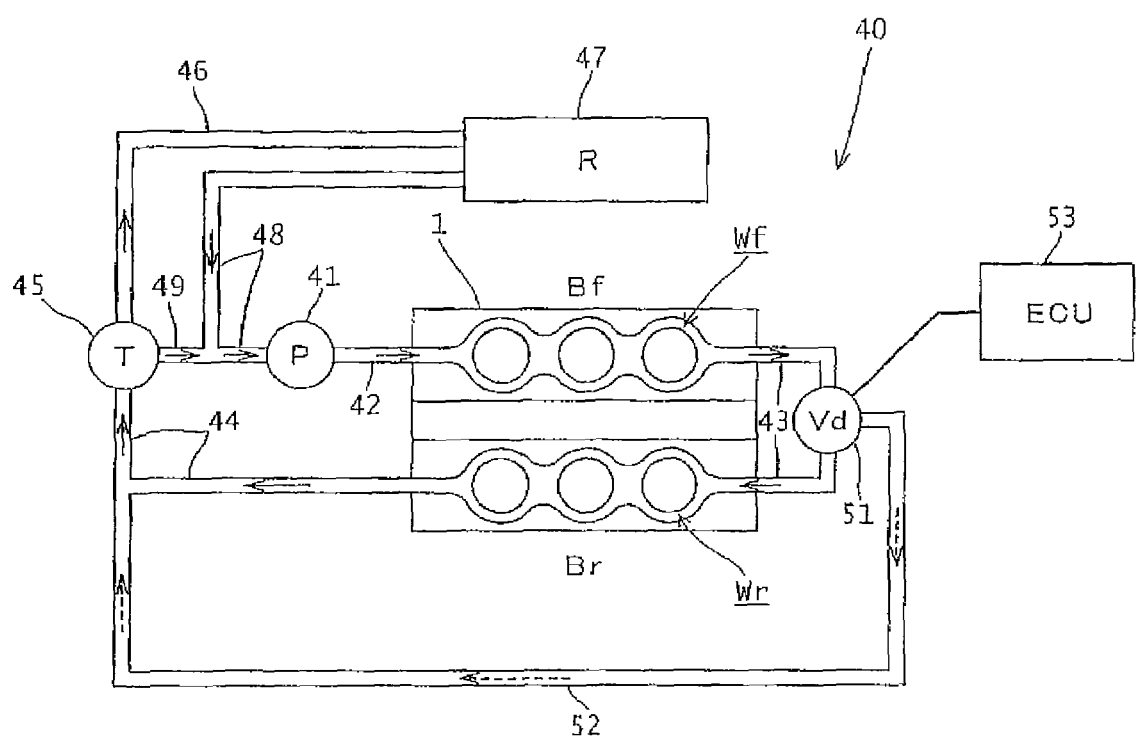
FIG. 3 is a schematic diagram of a cooling control unit including coolant circulation passages.

The front/rear V-type internal combustion engine with the front bank Bf having the normally activated cylinders and the rear bank Br having the deactivation-programmed cylinders has a cooling control unit 40 including coolant circulation passages as shown by a schematic diagram in FIG. 3.

A normally activated cylinder water jacket Wf additionally functioning as a coolant passage is formed around cylinder bores and combustion chambers in the cylinder block 2 and the cylinder head 4 on the side of the front bank Bf having the normally activated cylinders. Similarly, a deactivation-programmed cylinder water jacket Wr additionally functioning as a coolant passage is formed around the cylinder bores and combustion chambers in the cylinder block 2 and the cylinder head 4 on the side of the rear bank Br having the deactivation-programmed cylinders.

The coolant delivered from the a water pump 41 flows into the normally activated cylinder water jacket Wf from its inlet port after passing an exhaust passage 42, and subsequently circulates through the normally activated cylinder water jacket Wf, thereafter flowing out of the normally activated water jacket Wf through its discharging port. After flowing out of the water jacket, the coolant flows in the communicating passage 43 through which the discharging port of the normally activated cylinder water jacket and the inlet port of a deactivation-programmed cylinder water jacket Wr communicate with each other.

A discharging passage 44 extends from the discharging port of the deactivation-programmed cylinder water jacket Wr to a thermostat 45, and is thus connected to the thermostat 45.

A water supply pipe 46 extends from the thermostat 45 to a radiator 47. An intake pipe 48 extends from the radiator 47 to the water pump 41, and is thus connected to the water pump 41.

In addition, a bypass pipe 49 through which the water pump 41 intakes part of the coolant directly instead of via the radiator 47 extends from the thermostat 45 to the intake pipe 48, and is thus connected to the intake pipe 48.

Furthermore, this cooling control unit 40 has a diversion control valve 51 which is provided in the middle of the communicating passage 43. A bypass passage 52 diverging from the diversion control valve 51 is connected to the discharging passage 44 of the deactivation-programmed cylinder water jacket Wr while bypassing the deactivation-programmed cylinder water jacket Wr.

The diversion control valve 51 divides the coolant flown from the normally activated cylinder water jacket Wf, into a part of the coolant which is going to flow in the deactivation-programmed cylinder water jacket Wr and the other part of the coolant which is going to flow in the bypass passage 52. The diversion control valve 51 is capable of adjusting the diversion ratio between the flow of the coolant in the deactivation-programmed cylinder water jacket Wr and the flow of the coolant in the bypass passage 52 linearly without steps regardless of the pressures respectively of the two conduits. Controlled by an ECU (electronic control unit) 53, the diversion control valve 51 sets the diversion ratio.

Through monitoring the operating condition of the internal combustion engine 1, the ECU 53 drives and controls the diversion control valve 51 according to the operating condition, and thus sets the diversion ratio.

When the proportion of the flow in the bypass passage 52 is set at 0 (zero), the coolant discharged from the discharging port of the normally activated cylinder water jacket Wf into the communicating passage 43 all flows into the deactivation-programmed cylinder water jacket Wr. Conversely, when the proportion of the flow in the deactivation-programmed cylinder water jacket Wr is set at 0 (zero), the coolant discharged from the discharging port of the normally activated cylinder water jacket Wf into the communicating passage 43 all flows into the bypass passage 52. The diversion ratio between the coolant flowing in the deactivation-programmed cylinder water jacket Wr and the coolant flowing in the bypass passage 52 can be freely set up between the foregoing two cases.

While the internal combustion engine 1 is being warmed up, and while the motor vehicle is running normally, the internal combustion engine 1 is controlled in order that the internal combustion engine 1 can be operated with the deactivation-programmed cylinders in the rear bank Br being deactivated by the cylinder deactivation switching mechanism 20 and with only the normally activated cylinders in the front bank Bf being activated. While the internal combustion engine 1 is required to output power not less than a predetermined power, the internal combustion engine 1 is controlled in order that the internal combustion engine 1 can be operated with all of the cylinders being activated.

While the internal combustion engine 1 is being warmed up immediately after it is started, only the normally activated cylinders in the front bank Bf are activated with the remaining cylinders in the rear bank Br being deactivated. In this case, the cooling control unit 40 having the foregoing simple configuration causes the diversion control valve 51 to set the proportion of the flow in the deactivation-programmed cylinder water jacket Wr at 0 (zero) and the proportion of the flow in the bypass passage 52 at 100%, and thus causes all of the coolant passing the normally activated cylinder water jacket Wf after being delivered from the water pump 41 to flow to the bypass passage 52 which diverges from the communicating passage 43, and which bypasses the deactivation-programmed cylinder water jacket Wr. As a result, the coolant thus warmed reaches the thermostat 45. The thermostat 45 closes the valve of the water supply pipe 46 leading to the radiator 47, and thus causes the coolant coming from the internal combustion engine 1 to be directly taken into the water pump 41 via the bypass pipe 49 instead of via the radiator 47.

In sum, the coolant circulates through only the normally activated cylinder water jacket Wf and the bypass passage 52 without passing the radiator 47. This makes it possible to accelerate the warm-up of the internal combustion engine.

While the motor vehicle is running normally, the internal combustion engine 1 is kept operating with only the normally activated cylinders in the front bank Bf being activated for the purpose of placing an importance on fuel consumption. In this case, the thermostat 45 closes the valve of the bypass pipe 49, but opens the valve of the water supply pipe 46 leading to the radiator 47. For this reason, the coolant flowing out from the internal combustion engine 1 to the thermostat 45 is cooled while passing the radiator 47, and is subsequently supplied to the normally activated cylinder water jacket Wf. This makes it possible to efficiently cool only the front bank Bf of the internal combustion engine 1.

After the warm-up is completed with the temperature of the coolant in the normally activated cylinder water jacket Wf being raised to a predetermined temperature, the diversion control valve 51 is controlled in order that, after passing the normally activated cylinder water jacket Wf, the coolant should flow in an adequate amount in the deactivation-programmed cylinder water jacket Wr with a condition that the amount should not allow the temperature of the coolant in the normally activated cylinder water jacket Wf to go under a predetermined lowest coolant temperature.

As a result, the adequate amount of the coolant which has passed the normally activated cylinder water jacket Wf flows in the deactivation-programmed cylinder water jacket Wr, and the deactivation-programmed cylinders in the rear bank Bf which are currently not activated are kept warmed. Thereby, the cooling control unit 40 is capable of preventing the internal combustion engine 1 from being incompletely warmed up, and accordingly to smoothly switch the driving conditions, when the internal combustion engine returns to an operating condition with all of the cylinders being activated.

While all of the cylinders are being activated, the cooling control unit 40 controls the diversion control valve 51 in order that, after passing the normally activated cylinder water jacket Wf, the coolant should flow in the deactivation-programmed cylinder water jacket Wr without passing the bypass passage 52. This makes it possible to cool all of the cylinders efficiently.

Figure 4:
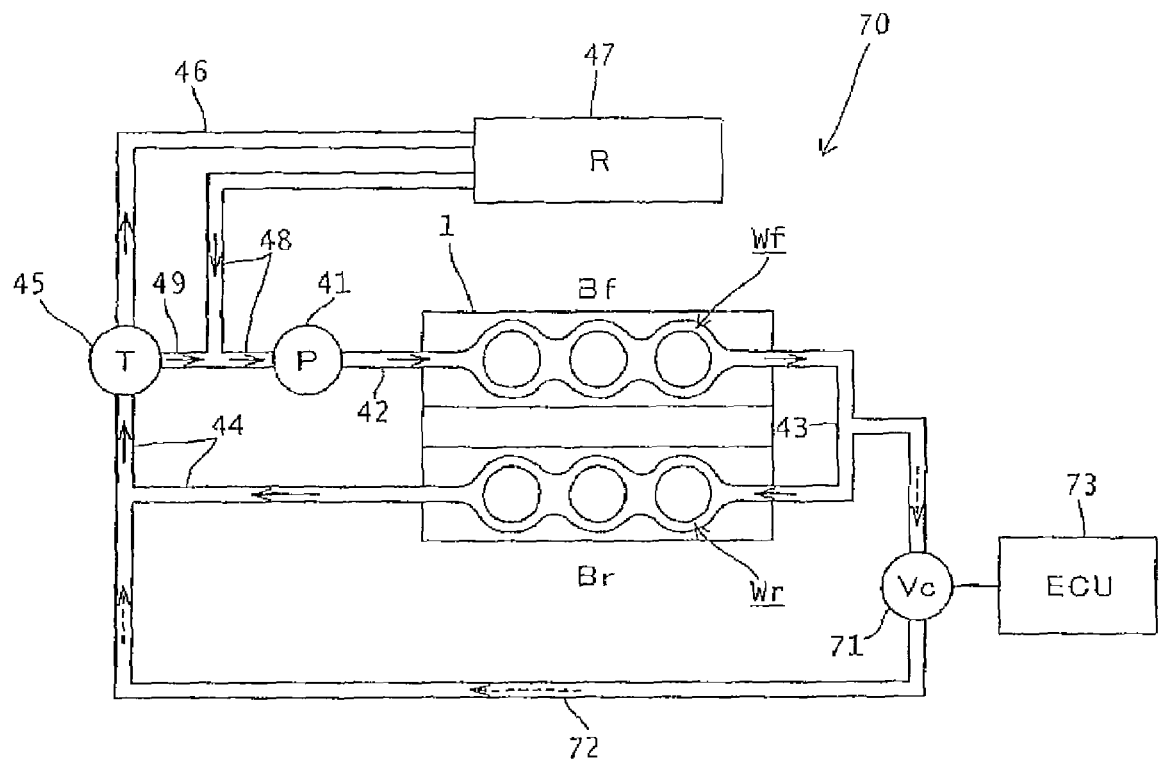
FIG. 4 is a schematic diagram of a cooling control unit according to another embodiment.

Descriptions will be provided next for a cooling control unit 70 according to another embodiment on a basis of a schematic diagram shown in FIG. 4.

The configuration of this cooling control unit 70 is the same as that of the cooling control unit 40 shown in FIG. 3, except that the configuration of the bypass passage of the cooling control unit 70 is different from that of the bypass passage of the cooling control unit 40. Descriptions will be provided by denoting members of the cooling control unit 70 which are the same as those of the cooling control unit 40 by the same reference numerals as those of the cooling control unit 40 are denoted.

A bypass passage 72 is formed which diverges from the middle of the communicating passage 43 through which the normally activated cylinder water jacket Wf and the deactivation-programmed cylinder water jacket Wr communicate with each other. The bypass passage 72 bypasses the deactivation-programmed cylinder water jacket Wr. The bypass passage 72 is connected to the discharging passage 44 of the deactivation-programmed cylinder water jacket Wr. This bypass passage 72 includes a flow rate adjusting valve 71 which is provided in the middle of the bypass passage 72. The flow rate adjusting valve 71 is controlled by an ECU 73.

When the flow rate adjusting valve 71 is completely closed, all of the coolant which has been discharged from the discharging port of the normally activated cylinder water jacket Wf to the communicating passage 43 is designed to flow into the deactivation-programmed cylinder water jacket Wr. The adjustment of the flow rate of coolant flowing in the bypass passage 72 by the opening of the flow rate adjusting valve 71 means the adjustment of the flow rate of coolant which diverges from the coolant flowing into the bypass passage 72, which thus circulates through the deactivation-programmed cylinder after flowing into the deactivation-programmed cylinder water jacket Wr.

Like the internal combustion engine 1 according to the previous embodiment, the internal combustion engine 1 according to the present embodiment is controlled in order that the deactivation-programmed cylinder in the rear bank Br should be deactivated by the cylinder deactivation switching mechanism 20 with only the normally activated cylinders in the front bank Bf being activated while the internal combustion engine 1 is being warmed up, and while the motor vehicle is running normally, as well as in order that all of the cylinders should be activated while the internal combustion engine 1 is required to output power not less than a predetermined power.

While the motor vehicle is running normally, the thermostat 45 closes the valve of the bypass pipe 49, but opens the valve of the water supply pipe 46 leading to the radiator 47. The coolant which has been discharged from the internal combustion engine 1 to the thermostat 45 is cooled while passing the radiator 47, and is subsequently supplied to the normally activated cylinder water jacket Wf. This makes it possible to cool only the front bank Bf of the internal combustion engine 1 efficiently.

After the temperature of the coolant flowing in the normally activated cylinder water jacket Wf rises to a predetermined temperature, the flow rate adjusting valve 71 is controlled in order that, after passing the normally activated cylinder water jacket Wf, part of the coolant should flow in an adequate amount in the bypass passage 72 with a condition wherein the amount should not allow the temperature of the coolant flowing in the normally activated cylinder water jacket Wf to go under a predetermined lowest coolant temperature.

As a result, an adequate amount of the coolant which has passed the normally activated cylinder water jacket Wf flows in the deactivation-programmed cylinder water jacket Wr, and the deactivation-programmed cylinders in the rear bank Bf which are currently not activated are kept warmed. Thereby, the cooling control unit 70 is capable of preventing the internal combustion engine 1 from being incompletely warmed up, when the internal combustion engine returns to an operating condition with all of the cylinders being activated.

While all of the cylinders are being activated, the flow rate adjusting valve 71 is controlled in order that, after passing the normally activated cylinder water jacket Wf, the coolant should flow in the deactivation-programmed cylinder water jacket Wr without passing the bypass passage 72. This control makes it possible to cool all of the cylinders efficiently.

Figure 5:
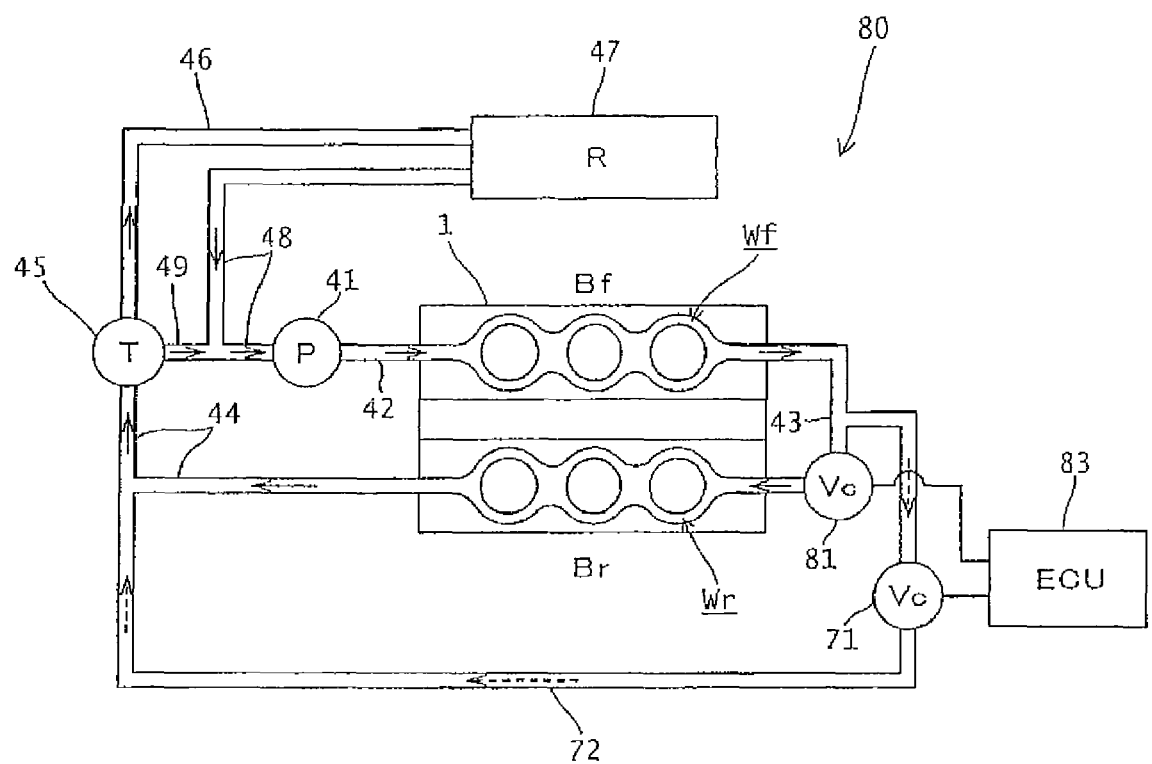
FIG. 5 is yet a schematic diagram of a cooling control unit according to yet another embodiment.

As illustrated in FIG. 5, an example of a cooling control unit 80 is shown that includes a second flow rate adjusting valve 81 provided in a location downstream of a diversion section wherein the bypass passage 72 diverges from the communicating passage 43 in addition to the flow rate adjusting valve 71 as included in the cooling control unit 70.

In this embodiment, the flow rate adjusting valve 71 will be referred to as a "first flow rate adjusting valve 71." An ECU 83 controls the drives respectively of the first flow rate adjusting valve 71 and the newly-added second flow rate adjusting valve 81.

It should be noted that, like the internal combustion engine 1 respectively according to the previous embodiments, the internal combustion engine 1 according to the present embodiment is controlled in order that, the deactivation-programmed cylinders in the rear bank Br should be deactivated by the cylinder deactivation switching mechanism 20 with only the normally activated cylinders in the front bank Bf being activated while the internal combustion engine 1 is being warmed up, and while the motor vehicle is running normally, as well as in order that all of the cylinders should be activated while the internal combustion engine 1 is required to output power not less than a predetermined power.

While the internal combustion engine 1 is being warmed up immediately after it is started, only the normally activated cylinders in the front bank Bf are activated with the remaining cylinders in the rear bank Br being deactivated. In this case, the internal combustion engine 1 opens the first flow rate adjusting valve 71, but closes the second flow rate adjusting valve 81. Thereby, ECU 83 makes a control in order that, after passing the normally activated cylinder water jacket Wf, the coolant should flow into the bypass passage 72 without passing the deactivation-programmed cylinder water jacket Wr. Subsequently, the coolant thus warmed reaches the thermostat 45. The thermostat 45 closes the valve of the water supply pipe 46 leading to the radiator 47, and thus causes the coolant coming from the internal combustion engine 1 to be directly taken into the water pump 41 via the bypass pipe 49 without passing the radiator 47.

In sum, the coolant circulates through only the normally activated cylinder water jacket Wf and the bypass passage 72 without passing the radiator 47. This makes it possible to accelerate the warm-up of the internal combustion engine.

While the motor vehicle is running normally, the internal combustion engine 1 is kept operating with only the normally activated cylinders in the front bank Bf being activated for the purpose of placing an importance on fuel consumption. In this case the thermostat 45 closes the valve of the bypass pipe 49, but opens the valve of the water supply pipe 46 leading to the radiator 47. For this reason, the coolant flowing out from the internal combustion engine 1 to the thermostat 45 is cooled while passing the radiator 47, and is subsequently supplied to the normally activated cylinder water jacket Wf. This makes it possible to efficiently cool only the front bank Bf of the internal combustion engine 1.

After the warm-up is completed with the temperature of the coolant in the normally activated cylinder water jacket Wf being raised to a predetermined temperature, the first flow rate adjusting valve 71 and the second flow rate adjusting valve 81 are controlled in order that, after passing the normally activated cylinder water jacket Wf, the coolant should flow in an adequate amount in the deactivation-programmed cylinder water jacket Wr with a condition wherein the amount should not allow the temperature of the coolant in the normally activated cylinder water jacket Wf to go under a predetermined lowest coolant temperature.

As a result, the adequate amount of the coolant which has passed the normally activated cylinder water jacket Wf flows in the deactivation-programmed cylinder water jacket Wr, and the deactivation-programmed cylinders in the rear bank Bf which are currently not activated are kept warmed. Thereby, the cooling control unit 80 is capable of preventing the internal combustion engine 1 from being incompletely warmed up, and accordingly to smoothly switch the driving conditions, when the internal combustion engine returns to an operating condition with all of the cylinders being activated.

While all of the cylinders are being activated, the internal combustion engine closes the first flow rate adjusting valve, but opens the second flow rate adjusting valve. Thereby, the internal combustion engine makes a control in order that, after passing the normally activated cylinder water jacket, the coolant should flow into the deactivation-programmed cylinder water jacket without passing the bypass passage. This makes it possible to cool all of the cylinders efficiently.

It should be noted that the flow rate adjusting valve 81 may be a simple on-off valve.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A cooling control unit for a water-cooled multi-cylinder internal combustion engine having a cylinder deactivation mechanism including a deactivation-programmed cylinder and a normally activated cylinder so as to partially deactivate the cylinders in accordance with the state of engine operation, the cooling control unit comprising:
    a communicating passage through which a normally activated cylinder coolant jacket and a deactivation-programmed cylinder coolant jacket communicate with each other, and through which a coolant flows between the jackets, the normally activated cylinder coolant jacket being a coolant passage formed for the normally activated cylinders, and the deactivation-programmed cylinder coolant jacket being a coolant passage formed for the deactivation-programmed cylinders;
    a bypass passage which diverges from the communicating passage, and which bypasses the deactivation-programmed cylinder coolant jacket;
    a diversion control valve provided to a diversion section where the bypass passage diverges from the communicating passage; and
    control means for controlling the diversion control valve in accordance with the operating state of the internal combustion engine.

2. The cooling control unit for the water-cooled multi-cylinder internal combustion engine having the cylinder deactivation mechanism according to claim 1,
    wherein the internal combustion engine is controlled in order that only the normally activated cylinders should be activated while the internal combustion engine is being warmed up, and while a vehicle is running normally, as well as in order that all of the cylinders should be activated while the internal combustion engine is required to output power not less than a predetermined power, and
    wherein while the internal combustion engine is being warmed up, the control means controls the diversion control valve in order that, after passing the normally activated cylinder coolant jacket, the coolant should flow in the bypass passage without passing the deactivation-programmed cylinder coolant jacket,
    after the warm-up is completed with the temperature of the coolant in the normally activated cylinder coolant jacket rising to a predetermined temperature, the control means controls the diversion control valve in order that, after passing the normally activated cylinder coolant jacket, the coolant should flow in an adequate amount in the deactivation-programmed cylinder coolant jacket with a condition that the amount should not allow the temperature of the coolant in the normally activated cylinder coolant jacket to go under a predetermined lowest coolant temperature separately set, and while all of the cylinders are being activated, the control means controls the diversion control valve in order that, after passing the normally activated cylinder coolant jacket, the coolant should flow in the deactivation-programmed cylinder coolant jacket without passing the bypass passage.

3. The cooling control unit for the water-cooled multi-cylinder internal combustion engine having the cylinder deactivation mechanism according to claim 1,
wherein the internal combustion engine is a front/rear V-type internal combustion engine such that the normally activated cylinders tilt frontward of a vehicle, and the deactivation-programmed cylinders tilt rearward of the vehicle, so that the internal combustion engine has a V-shape in a side view.

4. The cooling control unit for the water-cooled multi-cylinder internal combustion engine having the cylinder deactivation mechanism according to claim 2,
wherein the internal combustion engine is a front/rear V-type internal combustion engine such that the normally activated cylinders tilt frontward of a vehicle, and the deactivation-programmed cylinders tilt rearward of the vehicle, so that the internal combustion engine has a V-shape in a side view.

5. The cooling control unit for the water-cooled multi-cylinder internal combustion engine having the cylinder deactivation mechanism according to claim 1, and further including a pump operatively connected to the activated cylinder coolant jacket and to a radiator for circulating the coolant.

6. The cooling control unit for the water-cooled multi-cylinder internal combustion engine having the cylinder deactivation mechanism according to claim 5, and further including a thermostat operatively connected to said bypass passage, the radiator and the pump for controlling the flow of coolant to the radiator and the pump depending on the operating conditions of the internal combustion engine.

7. A cooling control unit for a water-cooled multi-cylinder internal combustion engine having a cylinder deactivation mechanism including a deactivation-programmed cylinder and a normally activated cylinder so as to partially deactivate the cylinders in accordance with the state of engine operation, the cooling control unit comprising:
a communicating passage through which a normally activated cylinder coolant jacket and a deactivation-programmed cylinder coolant jacket communicate with each other, and through which a coolant flows between the jackets, the normally activated cylinder coolant jacket being a coolant passage formed for the normally activated cylinders, and the deactivation-programmed cylinder coolant jacket being a coolant passage formed for the deactivation-programmed cylinders;
a bypass passage which diverges from the communicating passage, and which bypasses the deactivation-programmed cylinder coolant jacket;
a flow rate adjusting valve provided in the bypass passage; and
control means for controlling the flow rate adjusting valve in accordance with the operating state of the internal combustion engine.

8. The cooling control unit for the water-cooled multi-cylinder internal combustion engine having the cylinder deactivation mechanism according to claim 7,
wherein the internal combustion engine is controlled in order that only the normally activated cylinders should be activated while the internal combustion engine is being warmed up, and while a vehicle is running normally, as well as in order that all of the cylinders should be activated while the internal combustion engine is required to output power not less than a predetermined power, and
wherein after the temperature of the coolant in the normally activated cylinder coolant jacket rises to a predetermined temperature, the control means controls the flow rate adjusting valve in order that, after passing the normally activated cylinder coolant jacket, the coolant should flow in an adequate amount in the bypass passage with a condition that the amount should not allow the temperature of the coolant in the normally activated cylinder coolant jacket to go under a predetermined lowest coolant temperature separately set, and
while all of the cylinders are being activated, the control means shuts off the bypass passage by closing the flow rate adjusting valve in order that, after passing the normally activated cylinder coolant jacket, the coolant should flow in the deactivation-programmed cylinder coolant jacket without passing the bypass passage.

9. The cooling control unit for the water-cooled multi-cylinder internal combustion engine having the cylinder deactivation mechanism according to claim 7,
wherein the internal combustion engine is a front/rear V-type internal combustion engine such that the normally activated cylinders tilt frontward of a vehicle, and the deactivation-programmed cylinders tilt rearward of the vehicle, so that the internal combustion engine has a V-shape in a side view.

10. The cooling control unit for the water-cooled multi-cylinder internal combustion engine having the cylinder deactivation mechanism according to claim 8,
wherein the internal combustion engine is a front/rear V-type internal combustion engine such that the normally activated cylinders tilt frontward of a vehicle, and the deactivation-programmed cylinders tilt rearward of the vehicle, so that the internal combustion engine has a V-shape in a side view.

11. The cooling control unit for the water-cooled multi-cylinder internal combustion engine having the cylinder deactivation mechanism according to claim 7, and further including a pump operatively connected to the activated cylinder coolant jacket and to a radiator for circulating the coolant.

12. The cooling control unit for the water-cooled multi-cylinder internal combustion engine having the cylinder deactivation mechanism according to claim 11, and further including a thermostat operatively connected to said bypass passage, the radiator and the pump for controlling the flow of coolant to the radiator and the pump depending on the operating conditions of the internal combustion engine.

13. A cooling control unit for a water-cooled multi-cylinder internal combustion engine having a cylinder deactivation mechanism including a deactivation-programmed cylinder and a normally activated cylinder so as to partially deactivate the cylinders in accordance with the state of engine operation, the cooling control unit comprising:
a communicating passage through which a normally activated cylinder coolant jacket and a deactivation-programmed cylinder coolant jacket communicate with each other, and through which a coolant flows between the jackets, the normally activated cylinder coolant jacket being a coolant passage formed for the normally activated cylinders, and the deactivation-programmed cylinder coolant jacket being a coolant passage formed for the deactivation-programmed cylinders;

a bypass passage which diverges from the communicating passage, and which bypasses the deactivation-programmed cylinder coolant jacket;

a first flow rate adjusting valve provided in the bypass passage;

a second flow rate adjusting valve provided at a location downstream of a diversion section where the bypass passage diverges from the communicating passage; and control means for controlling the first flow rate adjusting valve and the second flow rate adjusting valve in accordance with the operating state of the internal combustion engine.

14. The cooling control unit for the water-cooled multi-cylinder internal combustion engine having the cylinder deactivation mechanism according to claim 13, wherein the internal combustion engine is controlled in order that only the normally activated cylinders should be activated while the internal combustion engine is being warmed up, and while a vehicle is running normally, as well as in order that all of the cylinders should be activated while the internal combustion engine is required to output power not less than a predetermined power, and wherein while the internal combustion engine is being warmed up, the control means opens the first flow rate adjusting valve and closes the second flow rate adjusting valve in order that, after passing the normally activated cylinder coolant jacket, the coolant should flow in the bypass passage without passing the deactivation-programmed cylinder coolant jacket, after the warm-up is completed with the temperature of the coolant in the normally activated cylinder coolant jacket rising to a predetermined temperature, the control means controls the first flow rate adjusting valve and the second flow rate adjusting valve in order that, after passing the normally activated cylinder coolant jacket, the coolant should flow in an adequate amount in the deactivation-programmed cylinder coolant jacket with a condition that the amount should not allow the temperature of the coolant in the normally activated cylinder coolant jacket to go under a predetermined lowest coolant temperature separately set, and while all of the cylinders are being activated, the control means closes the first flow rate adjusting valve and opens the second flow rate adjusting valve in order that, after passing the normally activated cylinder coolant jacket, the coolant should flow in the deactivation-programmed cylinder coolant jacket without passing the bypass passage.

15. The cooling control unit for the water-cooled multi-cylinder internal combustion engine having the cylinder deactivation mechanism according to claim 13, wherein the internal combustion engine is a front/rear V-type internal combustion engine such that the normally activated cylinders tilt frontward of a vehicle, and the deactivation-programmed cylinders tilt rearward of the vehicle, so that the internal combustion engine has a V-shape in a side view.

16. The cooling control unit for the water-cooled multi-cylinder internal combustion engine having the cylinder deactivation mechanism according to claim 14, wherein the internal combustion engine is a front/rear V-type internal combustion engine built in a way that the normally activated cylinders tilt frontward of the vehicle, and the deactivation-programmed cylinders tilt rearward of the vehicle, so that the internal combustion engine has a V-shape in a side view.

17. The cooling control unit for the water-cooled multi-cylinder internal combustion engine having the cylinder deactivation mechanism according to claim 13, and further including a pump operatively connected to the activated cylinder coolant jacket and to a radiator for circulating the coolant.

18. The cooling control unit for the water-cooled multi-cylinder internal combustion engine having the cylinder deactivation mechanism according to claim 17, and further including a thermostat operatively connected to said bypass passage, the radiator and the pump for controlling the flow of coolant to the radiator and the pump depending on the operating conditions of the internal combustion engine.

* * * * *